United States Patent
Aoki et al.

(10) Patent No.: US 6,910,254 B2
(45) Date of Patent: Jun. 28, 2005

(54) METHOD OF INSTALLING DOOR OF CAR AND DOOR HINGE ASSEMBLY JIG

(75) Inventors: Akira Aoki, Saitama (JP); Kunio Yamasaki, Saitama (JP); Yasuyoshi Hashimoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/344,411

(22) PCT Filed: Mar. 16, 2001

(86) PCT No.: PCT/JP01/02112
§ 371 (c)(1),
(2), (4) Date: Sep. 11, 2003

(87) PCT Pub. No.: WO02/18196
PCT Pub. Date: Mar. 7, 2002

(65) Prior Publication Data
US 2004/0034984 A1 Feb. 26, 2004

(30) Foreign Application Priority Data
Aug. 30, 2000 (JP) .................................. 2000-266014
Aug. 30, 2000 (JP) .................................. 2000-266015

(51) Int. Cl.$^7$ ................................................ B23Q 3/00
(52) U.S. Cl. ................... 29/464; 29/407.1; 29/897.2; 29/281.1
(58) Field of Search .................. 29/407.09, 407.1, 29/464, 468, 897.2, 281.1, 11, 281.5, 281.4, 460, 458, 434

(56) References Cited

U.S. PATENT DOCUMENTS

| | | | | |
|---|---|---|---|---|
| 4,375,716 A | * | 3/1983 | Armstrong et al. ........... | 29/404 |
| 4,736,515 A | * | 4/1988 | Catena ........................ | 29/714 |
| 4,807,331 A | * | 2/1989 | Calucci ........................ | 16/262 |
| 4,864,687 A | * | 9/1989 | Calcaterra et al. ............ | 16/237 |
| 5,033,163 A | * | 7/1991 | Kaibuki et al. ............... | 16/386 |
| 5,040,290 A | * | 8/1991 | Usui et al. .................... | 29/787 |
| 5,181,307 A | * | 1/1993 | Kitahama et al. ............. | 29/434 |
| 5,203,811 A | * | 4/1993 | Hirotani et al. .......... | 29/407.05 |
| 5,796,615 A | * | 8/1998 | Madaraishi et al. ........ | 700/109 |
| 6,122,809 A | * | 9/2000 | Roy ............................ | 29/239 |
| 6,122,813 A | * | 9/2000 | Roy et al. ................ | 29/407.09 |
| 6,248,172 B1 | * | 6/2001 | Shirotani et al. ........... | 118/500 |
| 6,311,382 B1 | * | 11/2001 | Jack ........................... | 29/464 |

FOREIGN PATENT DOCUMENTS

| | | |
|---|---|---|
| JP | 59-50875 | 3/1984 |
| JP | 62-102717 | 6/1987 |
| JP | 2-254080 | 10/1990 |
| JP | 4-63330 | 5/1992 |
| JP | 8-39364 | 2/1996 |
| JP | 8-188186 | 7/1996 |
| JP | 10-45066 | 2/1998 |

* cited by examiner

Primary Examiner—David P. Bryant
(74) Attorney, Agent, or Firm—Arent Fox PLLC

(57) ABSTRACT

Positions of attachment of door-side hinge arms (2) of doors (Df, Dr) are previously determined. At a temporary door-fixing step (b, c) before coating, positions of hinge positioning and retaining means (30fa, 30fb; 30ra, 30rb) of a door hinge-assembling jig (J) set at a predetermined position on an automobile body (B) are adjusted, while taking account of the correction of the ill-fitting such as an inclination of the door due to its own weight or the like to be generated when the door (Df, Dr) will be attached to the automobile body (B) at a final door-attaching step (g) after the coating, and body-side hinge arms (1) of door hinges (Hfa, Hfb; Hra, Hrb) retained on the hinge positioning and retaining means (30fa, 30fb; 30ra, 30rb) are attached to the automobile body (B). Thus, the final attachment of the doors can be conducted properly without correction of any ill-fitting of the door after equipping.

13 Claims, 17 Drawing Sheets

METHOD OF INSTALLING DOOR OF CAR AND DOOR HINGE ASSEMBLY JIG

FIELD OF THE INVENTION

The present invention relates to a door mounting method for an automobile, and particularly, to an improvement of such method comprising a door hinge-attaching step of preparing door hinges each comprised of a body-side hinge arm, a door-side hinge arm, and a hinge pin which connects the hinge arms to each other for rotation relative to each other, and attaching the body-side hinge arms to an uncoated automobile body, a temporary door-fixing step of temporarily fixing uncoated doors to the door-side hinge arms of the door hinges, a coating step of coating the automobile body and the doors simultaneously after the temporary fixing step, a door-removing step of removing the doors from the door-side hinge arms after the coating step, an equipping step of equipping or fitting-out the coated automobile body and the coated doors individually, and a final door-attaching step of finally attaching the doors to the corresponding door-side hinge arms after the equipping step.

The present invention also relates to a door hinge-assembling jig for use in carrying out the above-described door mounting method.

BACKGROUND ART

A door mounting method for an automobile of the above-described type is disclosed in Japanese Patent Application Laid-open No. 2-254080, for example. In this door-mounting method, a difference between the color tones of an automobile body and doors can be eliminated by simultaneously coating the automobile body and the doors.

In the method disclosed in the above publication, however, when the door is finally attached to the door-side hinge arm of the door hinges attached to the automobile body after the fitting-out or the equipping of the automobile body and door, it is necessary to carry out the ill-fitting correction for correcting any inclination of the door due to its own weight or the like. For this reason, the final attaching operation is troublesome.

A door hinge-assembling jig for an automobile is already known, as disclosed in Japanese Patent Application Laid-open No. 8-39364, for example. The jig for assembling the door hinges to an automobile body, disclosed in the Japanese Patent Application Laid-open No. 8-39364, is constructed as follows: A pair of front and rear positioning pins are provided on a jig body, so that they can be fitted into reference bores in a front pillar and a center pillar of the automobile body, and a pair of upper and lower hinge-setting blocks for positioning and retaining the door hinges are mounted on a longitudinal rod of the jig body, so that their positions can be adjusted vertically and longitudinally.

However, such conventional door hinge-assembling jig suffers from the following disadvantages: Even when the ill-fitting of the door is corrected, the positions of attachment of the upper and lower hinge-setting blocks on the longitudinal rod are adjusted individually and for this reason, the adjusting operation is troublesome, and a long operating time is required.

DISCLOSURE OF THE INVENTION

The present invention has been accomplished with such circumstances in view, and it is an object of the present invention to provide a door mounting method for an automobile, wherein a final door attachment can be conducted properly without correction of any ill-fitting of the door after the equipping, thereby providing an enhancement in operating efficiency.

It is another object of the present invention to provide a door hinge-assembling jig for an automobile, wherein the positions of upper and lower hinge positioning and retaining means on a jig frame can be adjusted easily and quickly while taking account of the correction of the ill-fitting of the door.

To achieve the above object, according to the present invention, there is provided a door mounting method for an automobile, comprising a door hinge-attaching step of preparing door hinges each comprised of a body-side hinge arm, a door-side hinge arm, and a hinge pin which connects the hinge arms to each other for rotation relative to each other, and attaching the body-side hinge arms to an uncoated automobile body, a temporary door-fixing step of temporarily fixing uncoated doors to the door-side hing arms of the door hinges, a coating st p of coating the automobile body and the doors simultaneously after the temporary door-fixing step, a door-removing step of removing the doors from the door-side hinge arms after the coating step, an equipping step of equipping or fitting-out the coated automobile body and the coated doors individually, and a final door-attaching step of finally attaching the doors to the corresponding door-side hinge arms after the equipping step, wherein the positions of attachment of the door-side hinge arms on the doors are previously determined, and at the temporary door-fixing step, the positions of hinge positioning and retaining means of a door hinge-assembling jig set at a predetermined position on the automobile body are adjusted while taking account of the correction of the ill-fitting of the doors to be generated when the doors will be attached to the automobile body at the final door-attaching step, and the body-side hinge arms of the door hinges retained on the hinge positioning and retaining means are attached to the automobile body.

With the above arrangement, at the door hinge-attaching step, the positions of the hinge positioning and retaining means of the door hinge-assembling jig set at the predetermined position on the automobile body are adjusted while taking account of the correction of the ill-fitting of the doors to be generated when the doors will be attached to the automobile body at the final door-attaching step, and the body-side hinge arms of the door hinges retained on the hinge positioning and retaining means are attached to the automobile body. Therefore, after the equipment, the final attachment of the doors can be conducted properly without the correction of any ill-fitting of the doors and hence, the efficiency of the door attaching operation can be enhanced.

According to the present invention, in addition to the above feature, there is provided a door mounting method for an automobile, wherein at the door hinge-attaching step, front and rear door hinges for respectively supporting the front and rear doors are retained on the front and rear hinge positioning and retaining means provided on the same door hinge-assembling jig, and the body-side hinge arms of the front and rear door hinges are attached to a front pillar and a center pillar of the automobile body, respectively.

With the above arrangement, at the door hinge-attaching step, the front and rear door hinges are retained on the front and rear hinge positioning and retaining means provided on the same door hinge-assembling jig, and the body-side hinge arms of the front and rear door hinges are attached to the front pillar and the center pillar of the automobile body, respectively. Therefore, the attachment of the front and rear door hinges can be conducted easily and quickly.

According to the present invention, in addition to the above feature, there is provided a door mounting method for an automobile, wherein the temporary door-attaching step comprises a temporary rear door-fixing step for carrying out the temporary fixing of the rear door to the rear door hinges, and a temporary front door-fixing step for carrying out the temporary fixing of the front door to the front door hinges after the temporary rear door-fixing step.

With the above arrangement, in the temporary fixing of the front door, the temporary front door-fixing operation can be conducted without being interfered in anyway by the rear door and with a wide operating space by previously closing the temporarily fixed rear door.

According to the present invention, in addition to the above feature, there is provided a door mounting method for an automobile, wherein when the doors are temporarily fixed to the door-side hinge arms at the temporary door-fixing step, a temporary fixing bolt is used which has a head flange with a diameter smaller than that of a head flange of a bolt used to attach the doors to the door-side hinge arms at the final door-attaching step.

With the above arrangement, when the temporary fixing bolt has been disengaged after the coating to remove the doors, a non-coated portion of the automobile body, with which the head flange of the temporary fixing bolt has been in close contact, is covered with the head flange of the bolt used for the final attachment of the doors and thus, the non-coated portion can be prevented easily and reliably from being brought into an exposed state.

According to the present invention, there is provided a door hinge-assembling jig for an automobile, comprising a jig frame having positioning engage portions to be brought into engagement for positioning with at least two points of an outer wall of an automobile body, a support arm which is capable of being turned for adjustment along the outer wall of the automobile body and is connected to the jig frame by a pivot located in an intermediate portion between a pair of upper and lower hinge-mounting portions on the automobile body to extend vertically, an adjusting and fixing means capable of fixing the support arm at any turned and adjusted positions, and a pair of upper and lower hinge positioning and retaining means mounted at upper and lower opposite ends of the support arm for positioning and retaining door hinges to be bolted to the hinge-mounting portions.

With the above arrangement, the positions of the upper and lower hinge positioning and retaining means are adjusted in directions opposite from each other by loosing the adjusting and fixing means and turning the support arm about the pivot in a state in which the positioning engage portions of the jig frame have been brought into engagement with predetermined positioning engage portions of the automobile body, and then, the front and rear adjusting and fixing means are tightened. In this manner, the adjustments of the positions of the pair of upper and lower hinge positioning and retaining means can be conducted at a stroke while taking account of the correction of the ill-fitting of the door and hence, such an adjusting operating can be expedited.

According to the present invention, in addition to the above feature, there is provided a door hinge-assembling jig for an automobile, wherein a rope or a cable is connected to the jig frame for hanging down the jig frame.

With the above arrangement, the jig frame can be supported for movement in longitudinal and lateral directions of a vehicle with the rope or cable, and the positioning engagement of the positioning engage portions of the jig frame with the automobile body can be achieved easily.

Further, according to the present invention, in addition to the above feature, there is provided a door hinge-assembling jig for an automobile, wherein each of the hinge positioning and retaining means comprises a base plate fixed to the support arm, a stopper member fixedly mounted on the base plate, a push member supported on the base plate for movement between a closed position where the push member clamps a door-side hinge arm of the door hinge by cooperation with the stopper member, and an opened position where the push member is positioned at a distance apart from the stopper member to release the door-side hinge arm, and an operating means capable of operating the push member between the closed position and the opened position, the push member being provided with positioning members to be brought into engagement in bolt bores in the door-side hinge arm.

With the above arrangement, in the closed position of the push member, the door-side hinge arm can be retained at a predetermined location on the hinge positioning and retaining means by utilizing the bolt bores in the door-side hinge arm.

The above and other objects, features and advantages of the invention will become apparent from the following description of the preferred embodiment taken in conjunction with the accompanying drawings.

BEST MODE FOR CARRYING OUT THE INVENTION

The present invention will now be described by way of embodiments with reference to the accompanying drawings.

Figure 1:
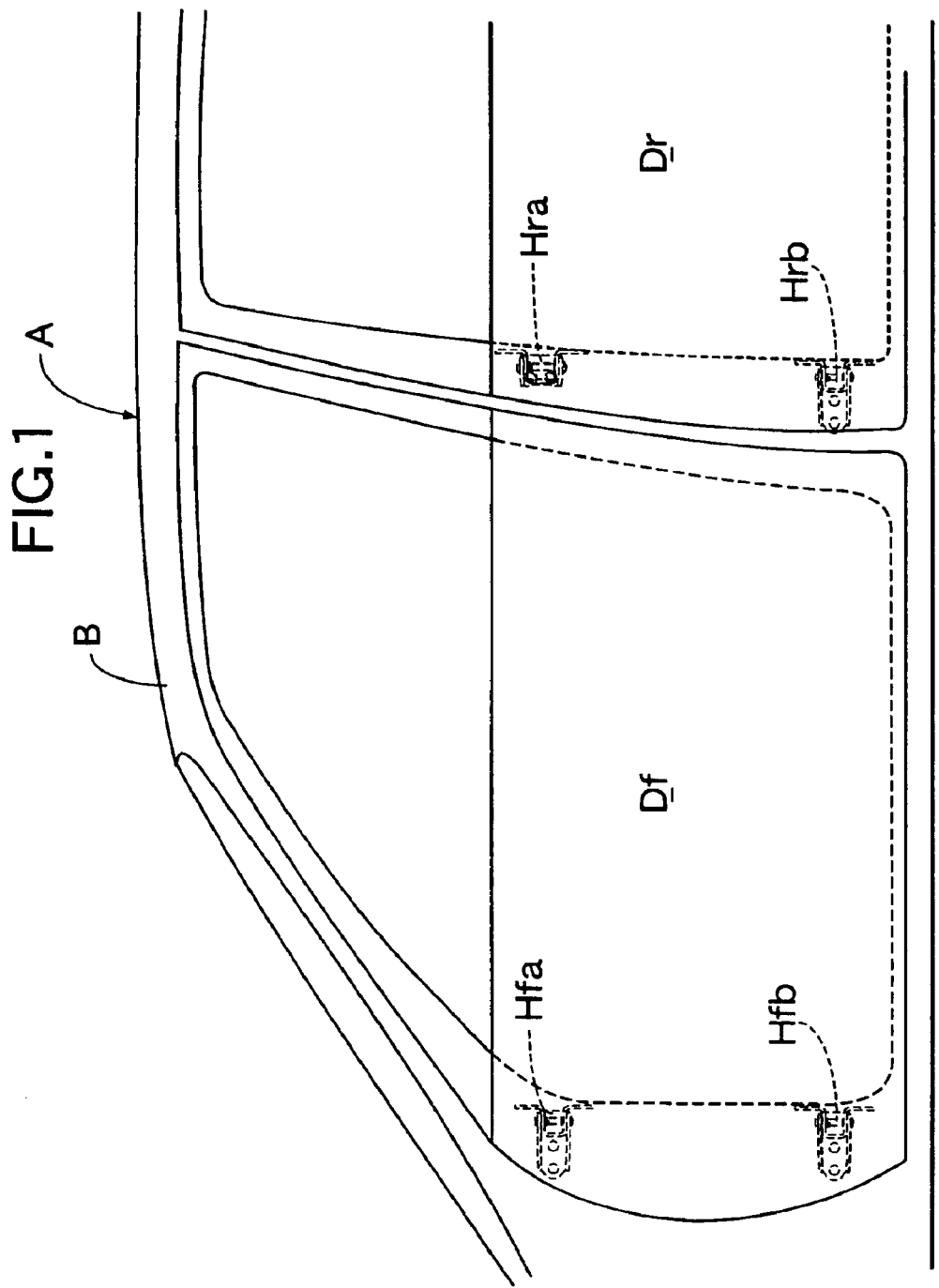
FIG. 1 is a side view of an essential portion of a completed automobile.

Referring to FIG. 1, a completed automobile A has a front door Df and a rear door Dr. The front door Df is attached to a front pillar Pf of an automobile body B through an upper front door hinge Hfa and a lower front door hinge Hfb which form a pair. The rear door Dr is attached to a center pillar Ps of the automobile body B through an upper rear door hinge Hra and a lower rear door hinge Hrb which form a pair.

Figure 2:
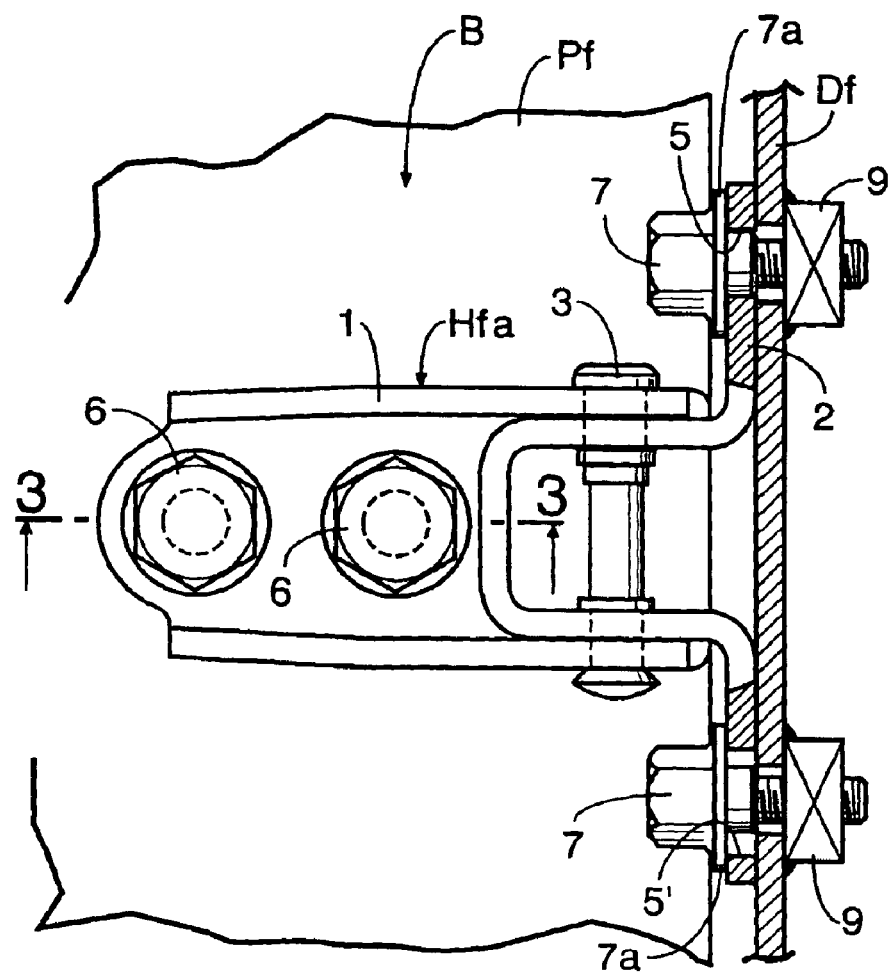
FIG. 2 is a partially vertical sectional front view showing a structure of mounting of an upper front door hinge to the automobile in FIG. 1.
Figure 3:
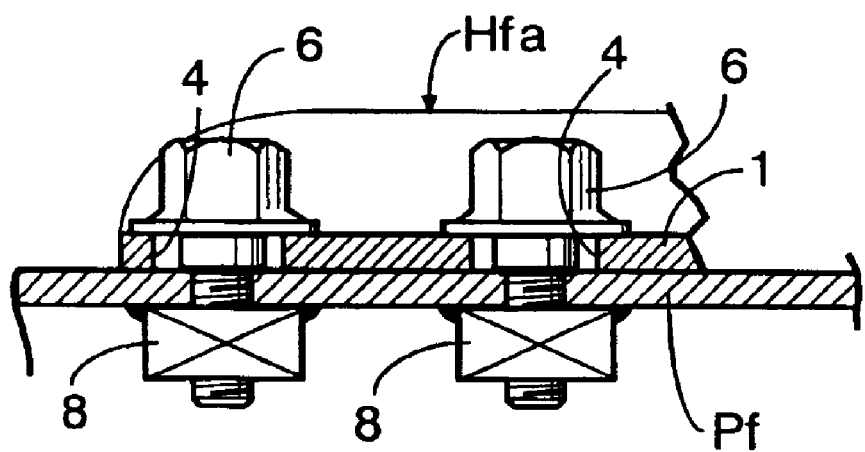
FIG. 3 is a sectional view taken along a line 3—3 in FIG. 2.

The upper and lower front door hinges Hfa and Hfb and the structure of attachment of the door hinges Hfa and Hfb to the automobile A will be first described with reference to FIGS. 2 and 3.

The upper front door hinge Hfa comprises a body-side hinge arm 1, a door-side hinge arm 2, and a hinge pin 3 which turnably connects both of hinge arms 1 and 2 to each other. A pair of bolt bores 4, 4 are provided in the body-side hinge arm 1, so that the body-side hinge arm 1 is secured to the front pillar Pf by threadedly fitting bolts 6, 6 inserted through the bolt bores 4, 4 into a pair of welding nuts 8, 8 secured to the front pillar Pf of the automobile body B to tighten the bolts 6, 6. In this case, each of the bolt bores 4, 4 is formed at a diameter sufficiently larger than that of each of the bolts 6, 6 to enable the position of mounting of the body-side hinge arm 1 to be adjusted finely.

A reference bolt bore 5 is provided in an upper end of the door-side hinge arm 2, and a large-diameter bolt bores 5' is provided in a lower end of the door-side hinge arm 2 (see FIG. 4), so that the door-side hinge arm 2 is secured to the front door Df by threadedly fitting stepped bolts 7, 7 inserted through the bolt bores 5 and 5' into welding nuts 9, 9 s cured to an upper portion of a front end wall of the front door Df to tighten the bolts 7, 7. In this case, a large-diameter shank of the stepped bolts 7 is fitted in the reference bolt bore 5 with almost no gap left therebetween, and a large-diameter shank of the stepped bolts 7 is fitted in the large-diameter bolt bore 5' with a relatively large gap left around the large-diameter shank.

Figure 4:
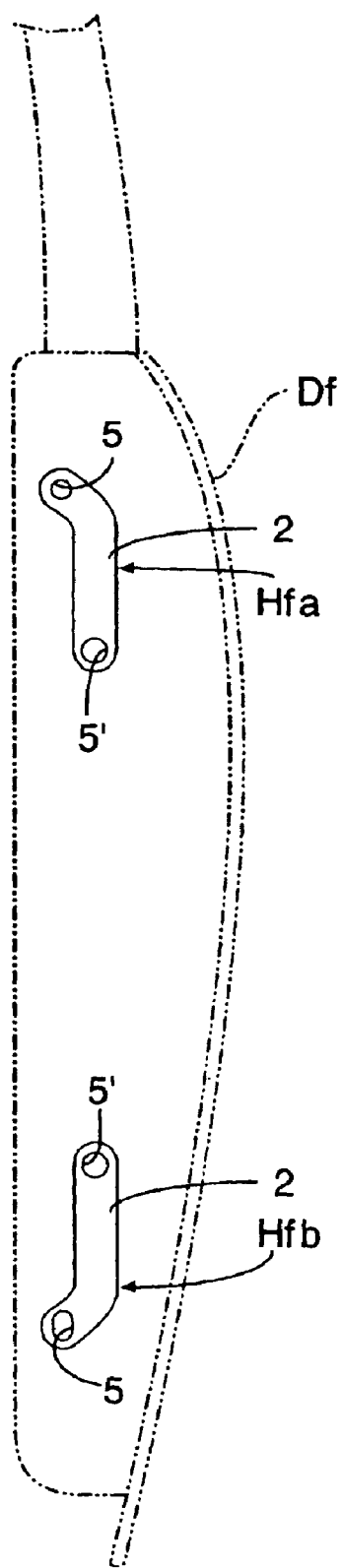
FIG. 4 is a front view of door-side hinge arms of upper and lower front door hinges shown in FIG. 1.

The lower front door hinge Hfb has an arrangement similar to that of the upper front door hinge Hfa, except for the shape of the door-side hinge arm 2. More specifically, as shown in FIG. 4, the door-side hinge arm 2 of the lower front door hinge Hfb has the large-diameter bolt bore 5' in its upper end and the reference bolt bore 5 comprising a vertically elongated bore and provided in its lower end (see FIG. 4), so that the door-side hinge arm 2 is secured to the front door Df by threadedly fitting the stepped bolts 7, 7 inserted through the bolt bores 5' and 5 into the welding nuts 9, 9 secured to the lower portion of the front end wall of the front door Df to tighten the stepped bolts 7, 7. In this case, the large-diameter portion of the stepped bolt 7 is put into abutment against opposite sidewalls of the vertically elongated reference bolt bore 5 with almost no gap left therebetween.

Thus, the position of mounting of the door-side hinge arm 2 of each of the upper and lower front door hinges Hfa and Hfb to the front door Df is determined by fitting of the large-diameter shank of the stepped bolt 7 in the reference bolt bore 5 in the door-side hinge arm 2 of each of the upper and lower front door hinges Hfa and Hfb.

Figure 5:
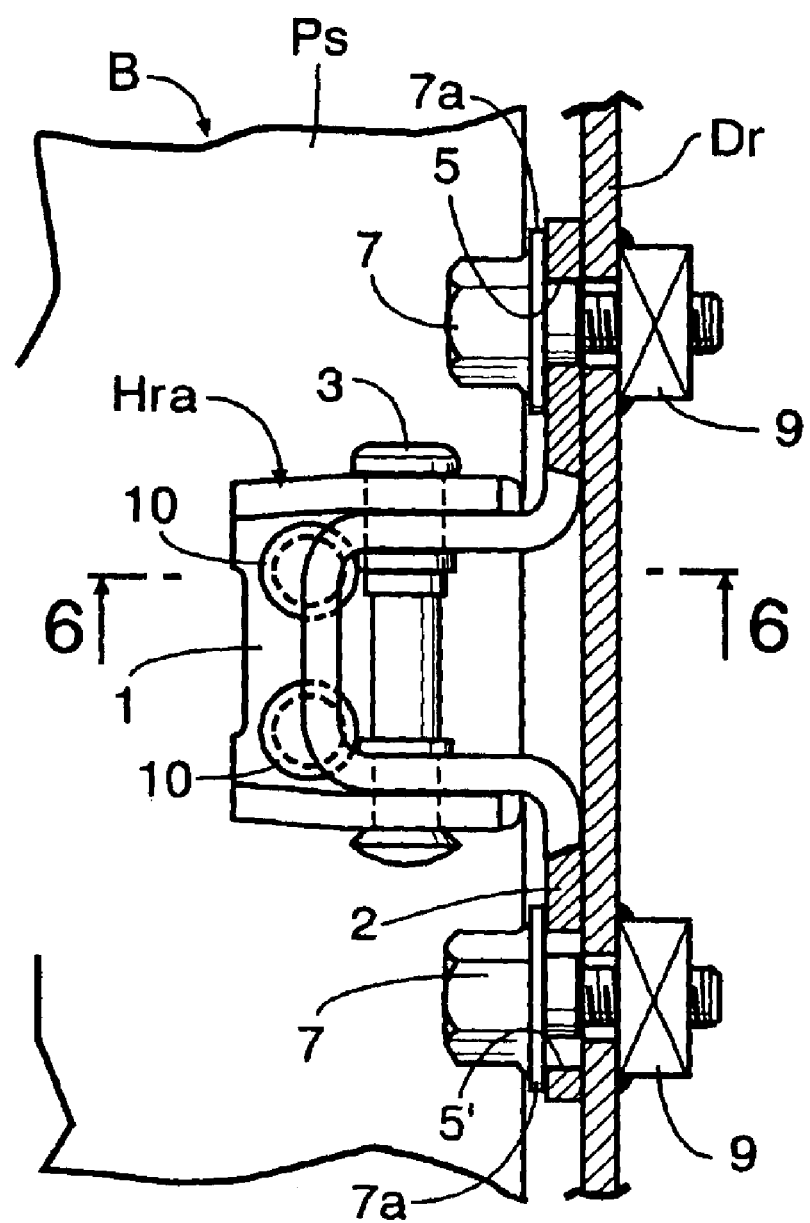
FIG. 5 is a partially vertical sectional front view showing a structure of mounting of an upper rear door hinge to the automobile shown in FIG. 1.
Figure 6:
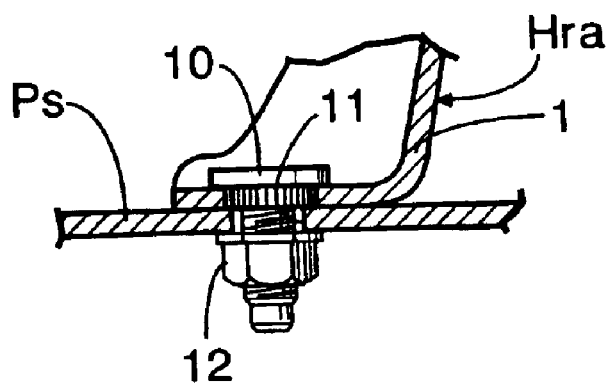
FIG. 6 is a sectional view taken along a line 6—6 in FIG. 5.

The upper and lower rear door hinges Hra and Hrb and the structure of mounting of the door hinges Hra and Hrb to the automobile will be described below with reference to FIGS. 5 and 6.

As does the upper front door hinge Hfa, the upper rear door hinge Hra also comprises a body-side hinge arm 1, a door-side hinge arm 2, and a hinge pin 3 which turnably connects both of the hinge arms 1 and 2 to each other. The door-side hinge arm 2 has a reference bolt bore 5 in its upper end and a large-diameter bolt bore 5' in its lower end, but heads of a pair of upper and lower coupling bolts 10 are previously secured to the body-side hinge arm 1. Thus, the body-side hinge arm 1 is secured to the center pillar Ps by inserting the coupling bolts 10 through bolt bores 11 in an outer wall of the center pillar Ps of the body B, and threadedly fitting nuts 12 over the coupling bolts 10 from a back side of the center pillar Ps to tighten the nuts 12. The securing of the door-side hinge arm 2 to the rear door Dr is conducted using stepped bolts 7, 7, as in the case of the front door hinge Hfa. Therefore, even in this case, a large-diameter shank of the stepped bolt 7 is fitted in the reference bolt bore 5 with almost no gap left therebetween, and a large-diameter shank of the stepped bolt 7 is fitted in the large-diameter bolt bore 5' with a relatively large gap left around the larger-diameter shank.

The lower rear door hinge Hrb has an arrangement basically similar to that of the upper rear door hinge Hra, except for the shapes of the body-side and door-side hinge arms 1 and 2. The structure of mounting of the lower rear door hinge Hrb to the automobile body B and the rear door Dr is also basically similar to that in the case of the upper rear door hinge Hra.

Even in this case, the position of mounting of the door-side hinge arm 2 of each of the upper and lower rear door hinges Hra and Hrb to the rear door Dr is determined by fitting of the large-diameter portion of the stepped bolt 7 in the reference bolt bore 5 in the door-side hinge arm 2 of each of the upper and lower rear door hinges Hra and Hrb.

Figure 7:
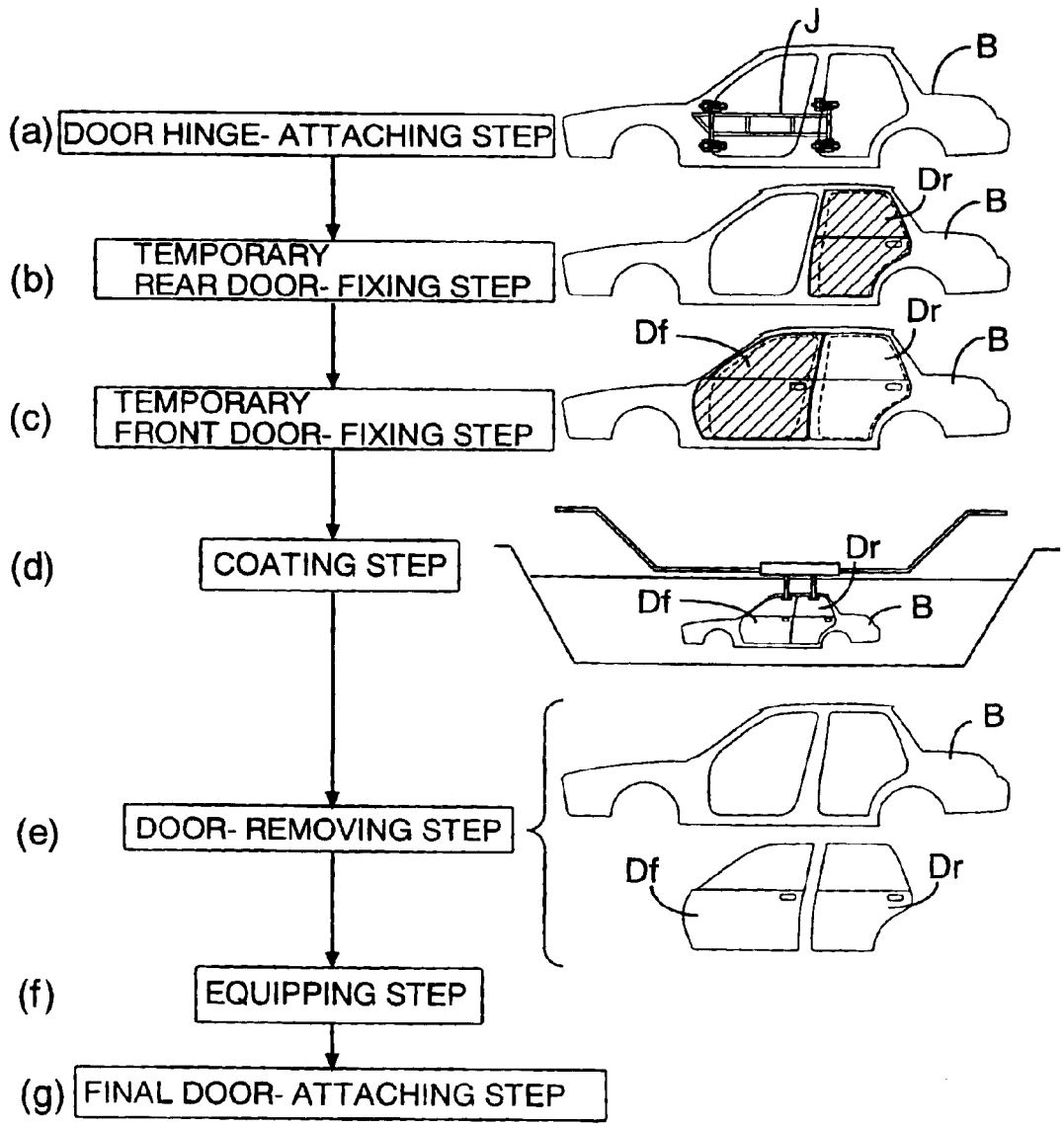
FIG. 7 is a diagram for explaining a portion of a process for manufacturing an automobile.

Steps of manufacturing such automobile A will be described with reference to FIG. 7.

First, the uncoated automobile body B resulting from a welding step, i.e., a white body B is transferred to a door hinge-attaching step (a). At the step (a), the body-side hinge arms 1, 1 of the upper and lower front door hinges Hfa and Hfb are attached to the front pillar Pf of the white body B, as described above, and the body-side hinge arms 1, 1 of the upper and lower rear door hinges Hra and Hrb are attached to the center pillar Ps of the white body B, as described above, using a door hinge-assembling jig J which will be described hereinafter.

Then, the white body B is transferred to a step (b) of temporarily fixing the rear door, at which the rear door Dr is temporarily fixed to the door-side hinge arms 2, 2 of the upper and lower rear door hinges Hra and Hrb already attached to the center pillar Ps of the white body B. The rear door Dr is closed and subsequently, the white body B is transferred to a step (c) of temporarily fixing the front door, at which the front door Df is temporarily fixed to the door-side hinge arms 2, 2 of the upper and lower front door hinges Hfa and Hfb already attached to the front pillar Pf. In this case, the temporary fixing of the front door Df can be carried out without being interfered in anyway by the rear door Dr, because the rear door Dr is in its closed state.

It should be noted here that in general, when the front door Df is closed, a rear end of the front door Df is in proximity to the upper and lower rear door hinges Hra and Hrb attached to the center pillar Ps. Therefore, if the front door Df is first temporarily fixed in an order reverse from the above-described order, it is not preferable. The reason is as follows: To ensure that the rear door Dr is then temporarily fixed without being obstructed by the front door Df, the front door Df must be retained in its opened state, and if the front door Df is retained in its opened state, the front door Df limits the movement of an operator outside the white body B.

Figure 8:
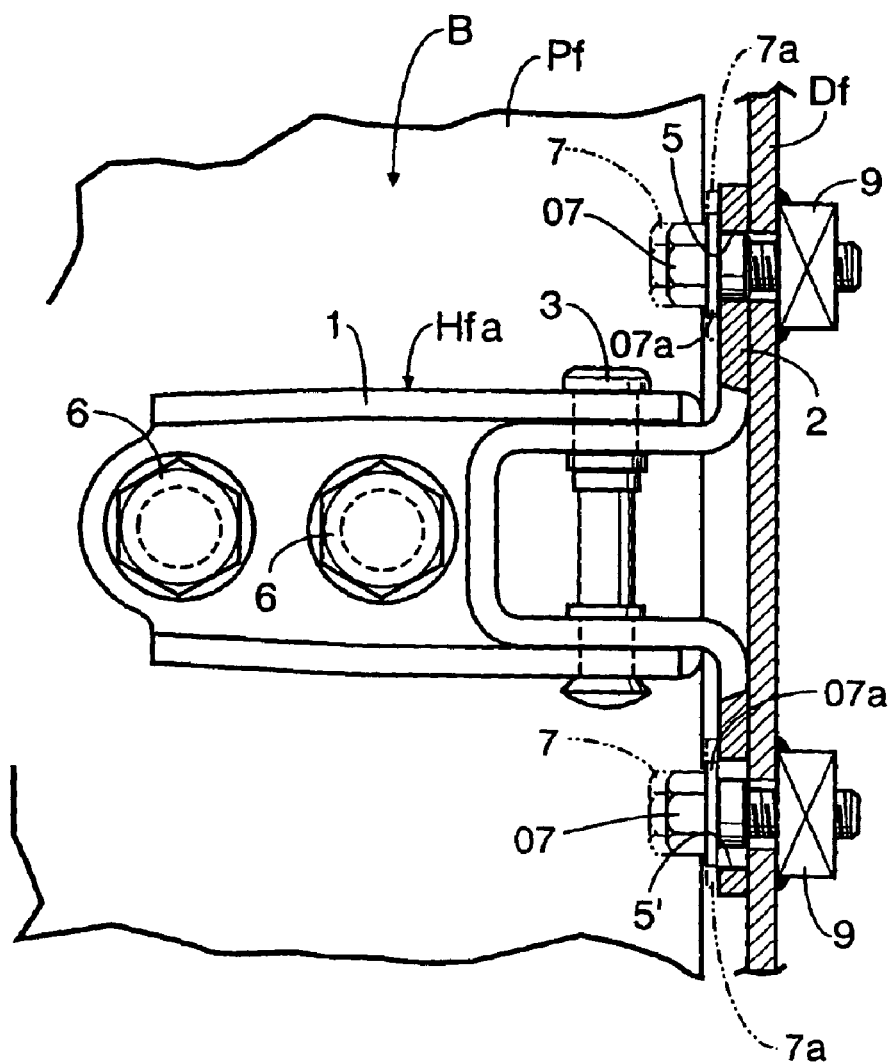
FIG. 8 is a sectional view showing a structure of temporary fixing of a door to each of the door hinges.
Figure 9:
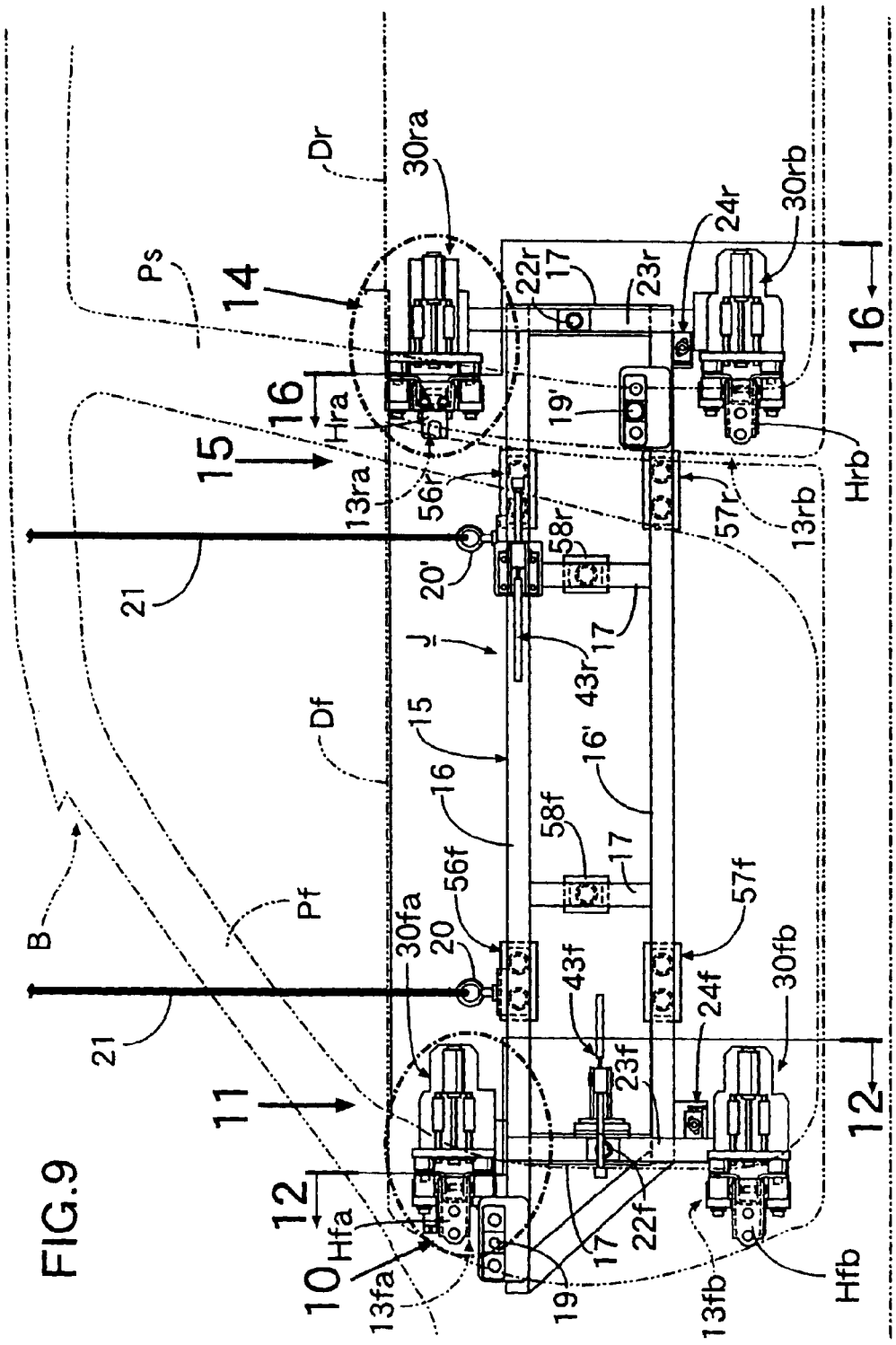
FIG. 9 is a front view of a jig for assembling the door hinges to an automobile body for use in the automobile manufacturing process.

During the temporary fixing of the rear door Dr and the front door Df, the door-side hinge arm 2 of each of the door hinges Hra, Hrb; Hfa, Hfb is coupled to the corresponding door Dr, Df by a temporary fixing bolt 07, as shown in FIG. 8. A head flange 07a of the temporary fixing bolt 07 is formed at a diameter smaller than that of a head flange 7a of the stepped bolt 7, but six corners of the heads of the bolts 7 and 07 are of the same shapes in order to enable the same tool to be used.

After the temporary fixing of the rear door Dr and the front door Df to the white body B, a front fender, a bonnet and a trunk lid are attached to the white body B. If the temporary fixing of the rear door Dr and the front door Df is carried out prior to the attachment of the front fender in this manner, the temporary fixing of the front door Df can be conducted without being obstructed by the front fender, which is advantageous for improving the operability.

The white body B, to which the rear door Dr and the front door Df have been temporarily fixed and the front fender, the bonnet and the trunk lid have been attached, in the above manner, is transferred to a next coating step (d), at which the white body B, the rear door Dr and the front door Df are simultaneously subjected to a coating. This makes it possible to eliminate a difference between tones of colors in the coating of the automobile body B and the doors Df and Dr as well as the front fender, the bonnet and the trunk lid.

After the coating, the automobile body B is transferred to a door-removing step (e), at which the front door Df is removed from the upper and lower front door hinges Hfa and Hfb, and the rear door Dr is removed from the upper and lower rear door hinges Hra and Hrb. Then, the automobile body B is transferred to a main assembling line, where the fitting-out or equipping such as mounting or attachment of an engine, suspensions and interiors is carried out, as usual. The front and rear doors Df and Dr are transferred to a door equipping step (f) in a sub-line, at which the equipping or fitting-out such as the mounting or attachment of a window regulator and interiors is carried out.

Thereafter, the doors Df and Dr are transferred to a final door-attaching step (g) in the main assembling line. At the step (g), the front door Df is attached to the door-side hinge arms 2, 2 of the corresponding upper and lower front door hinges Hfa and Hrb of the automobile body B by the regular stepped bolts 7, and the rear door Dr is also attached to the door-side hinge arms 2, 2 of the upper and lower rear door hinges Hra and Hrb by the regular stepped bolts 7.

Thus, after the equipping, the final attachment of the doors Df and Dr can be carried out properly without correction of any ill-fitting of the front and rear doors Df and Dr, and thus, the efficiency of the door-attaching operation can be enhanced.

The head flange 7a of the regular stepped bolt 7 is formed at the diameter larger than that of the head flange 07a of the temporary fixing bolt 07, as described above, and hence, when the door Df, Dr is attached to the corresponding door-side hinge arm 2 of each of the door hinges Hfa, Hfb; Hra, Hrb by the stepped bolt 7, a non-coated portion of the automobile body B, with which the head flange 07a of the temporary fixing bolt 07 has been in close contact, is covered with the head flange 7a of the stepped bolt 7 and thus, the non-coated portion can be prevented easily and reliably from being brought into an exposed state.

The arrangement of the door hinge-assembling jig J and a process for use of the jig will be described below with reference to FIGS. 9 to 16.

Referring first to FIGS. 9 to 12, the door hinge-assembling jig J includes a jig frame 15 having such a length that it extends between the front pillar Pf and the center pillar Ps of the automobile body B. The jig frame 15 is comprised of a pair of upper and lower elongated longitudinal frame elements 16 and 16' coupled to each other through a plurality of short cross frame elements 17.

A pair of positioning pins 19 and 19' (see FIGS. 9, 11, 12 and 16) are projectingly provided on the jig frame 15 and fitted into at least a pair of positioning bores 18 and 18' provided in the outer wall of the automobile body B. A predetermined set position for the door hinge-assembling jig J on the automobile body B is defined by the fitting of the positioning pins 19 and 19' in the positioning bores 18 and 18'.

A pair of front and rear eye bolts 20 and 20' are secured to the upper longitudinal frame element 16 of the jig frame 15, and ropes or cables 21 supported on a lift (not shown) are connected to the eye bolts 20 and 20', whereby the door hinge-assembling jig J is movably hung down in longitudinal and lateral directions of the automobile.

A front support arm 23f is turnably connected to a front portion of the jig frame 15 through a horizontal front pivot 22f, and a rear support arm 23r is turnably connected to a rear portion of the jig frame 15 through a horizontal rear pivot 22r. When the jig frame 15 occupies the predetermined set position, the front pivot 22f is located at a substantially middle point between a pair of upper and lower hinge-mounting portions 13fa, 13fba, 13fa, 13fbb of the front pillar Pf. In addition, when the jig frame 15 occupies the predetermined set position, the rear pivot 22r is located at a substantially middle point between a pair of upper and lower hinge-mounting portions 13ra, 13rba, 13ra, 13rbb of the center pillar Ps.

Front and rear adjusting and fixing means 24f and 24r are provided between the jig frame 15 and the front and rear support arms 23f and 23r, respectively, and are capable of fixing turned and adjusted positions for the corresponding support arms 23f and 23r.

Figure 10:
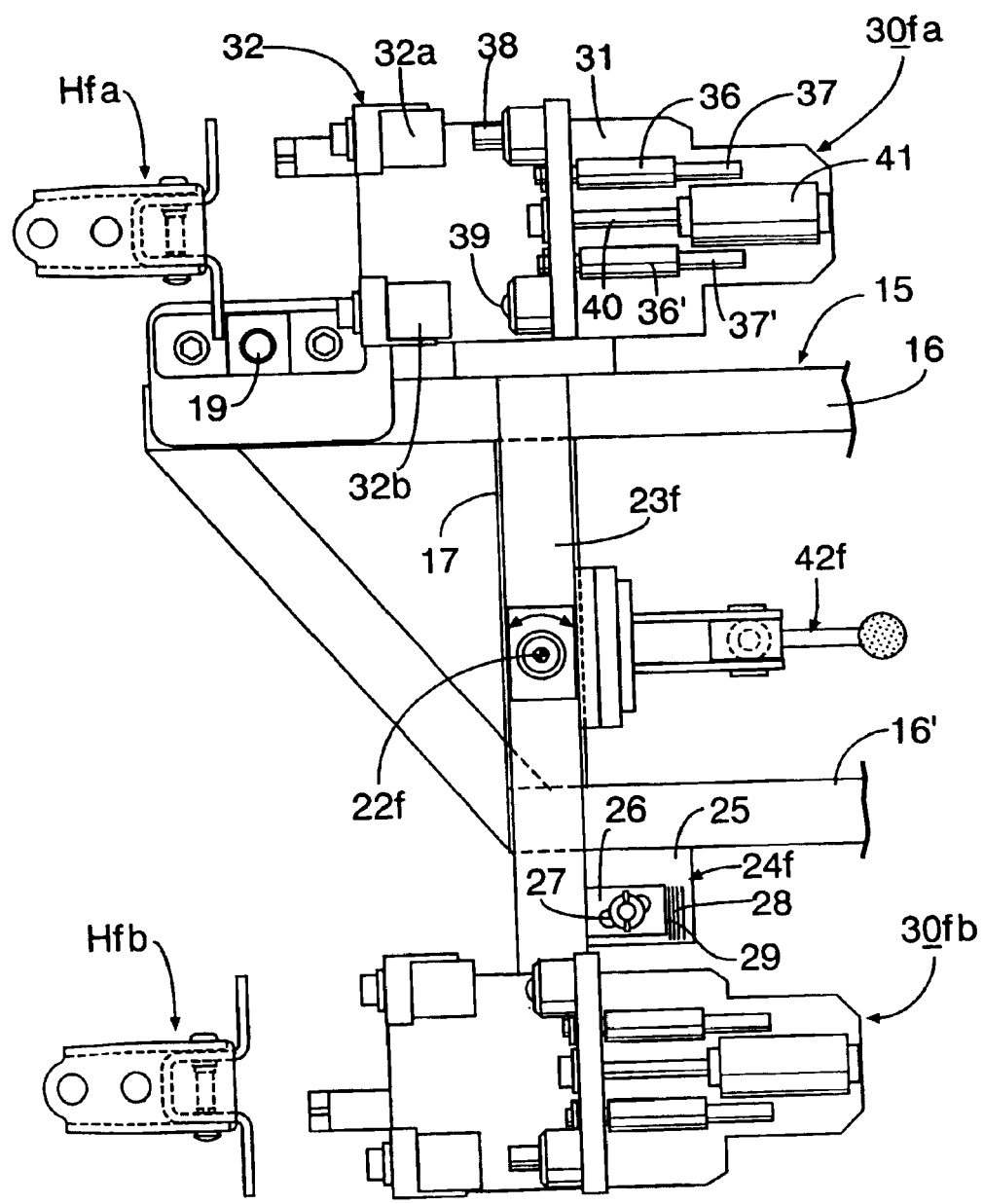
FIG. 10 is an enlarged view of a portion indicated by 10 in FIG. 9 (shown with the upper and lower front door hinges removed)
Figure 11:
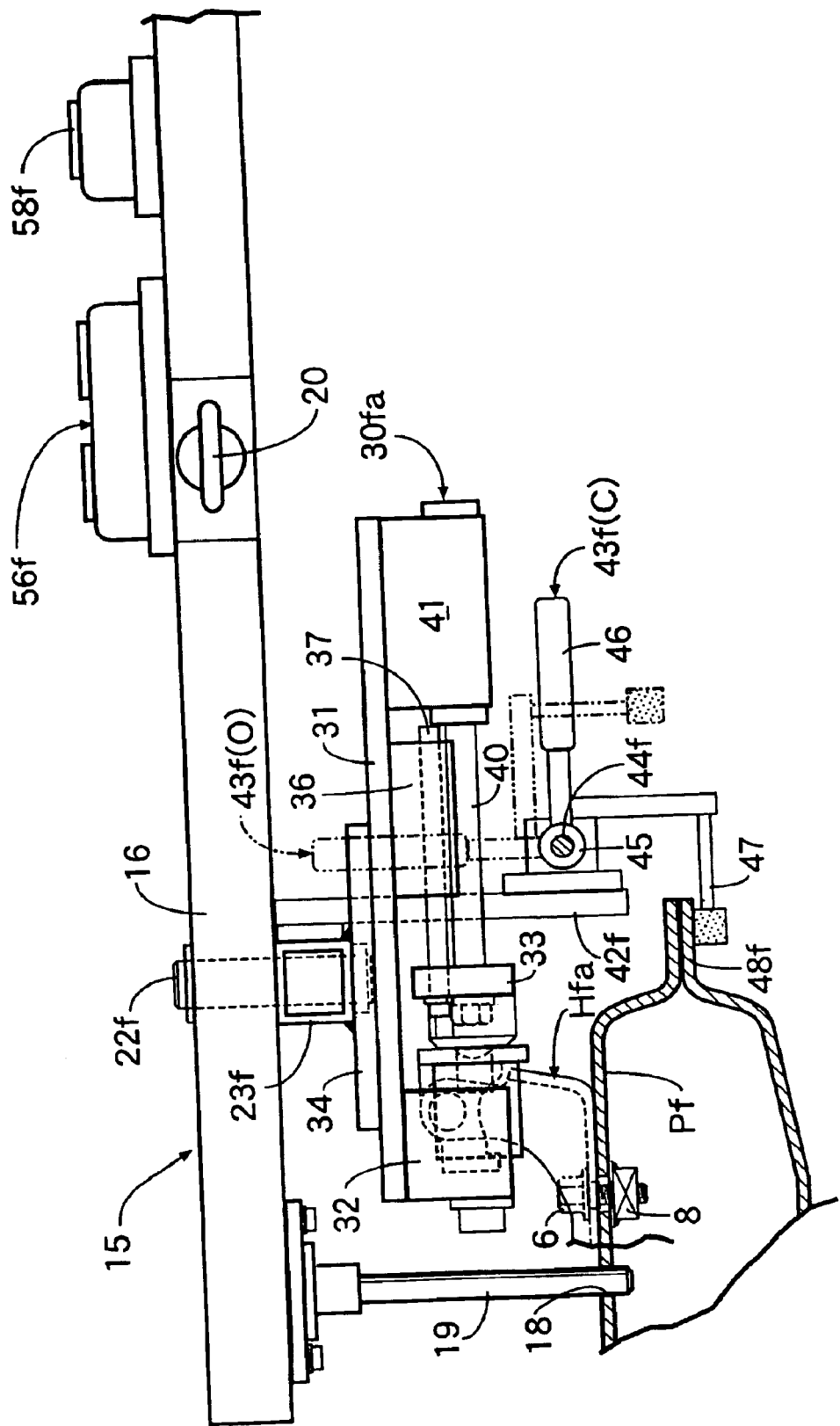
FIG. 11 is a view taken in the direction of an arrow 11 in FIG. 9.
Figure 12:
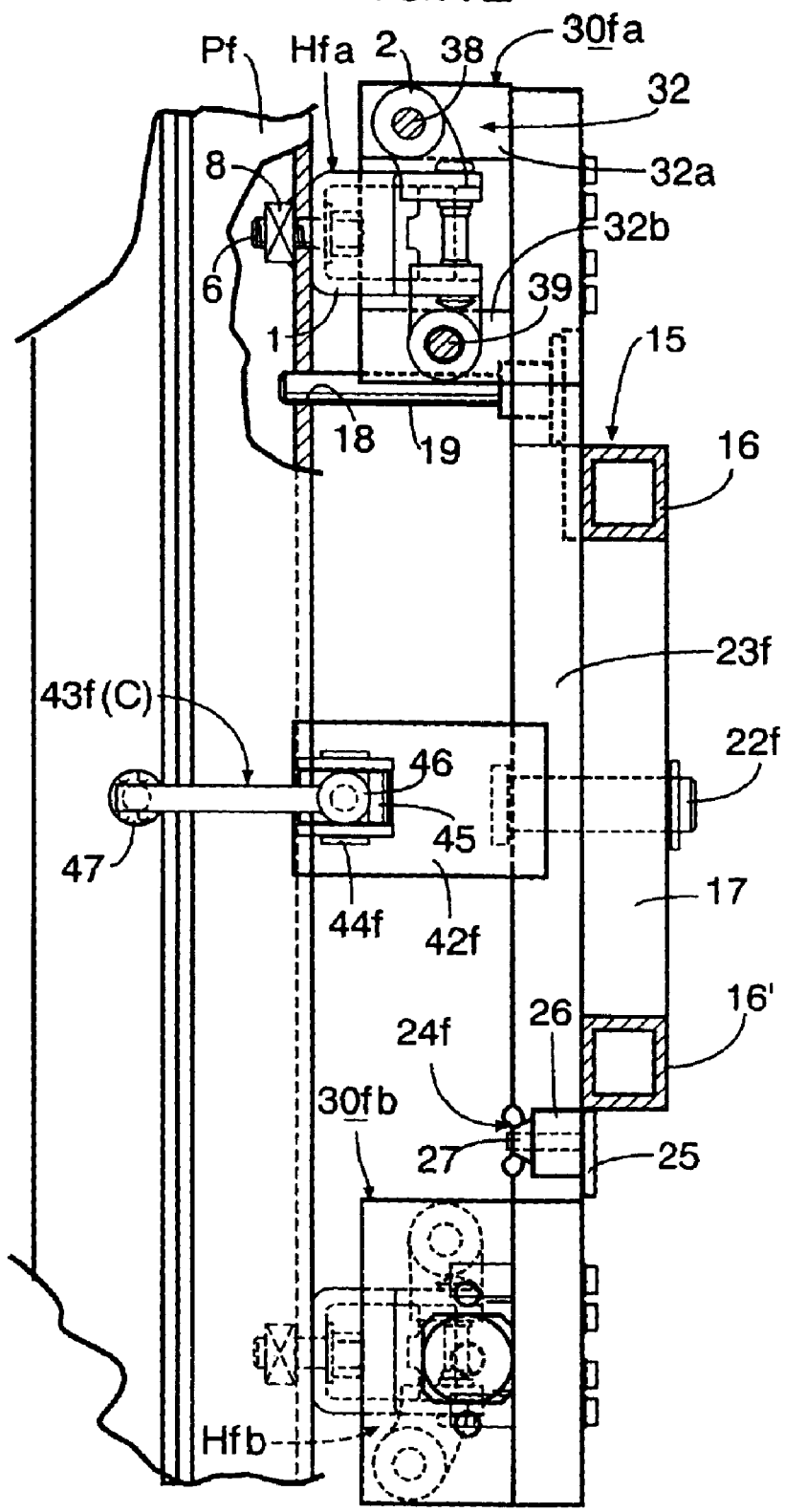
FIG. 12 is a sectional view taken along a line 12—12 in FIG. 9.
Figure 14:
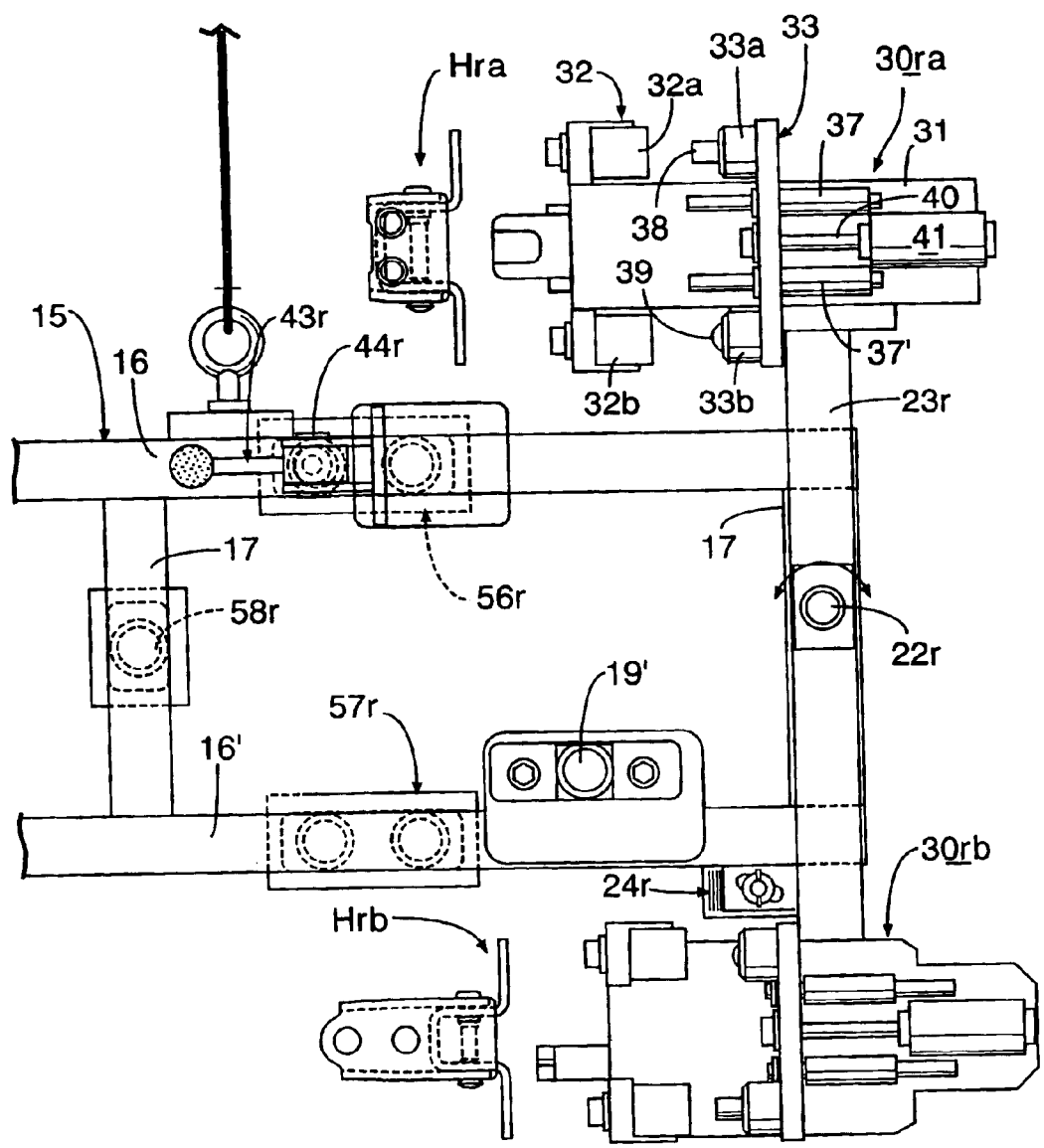
FIG. 14 is an enlarged view of a portion indicated by 14 in FIG. 9.
Figure 15:
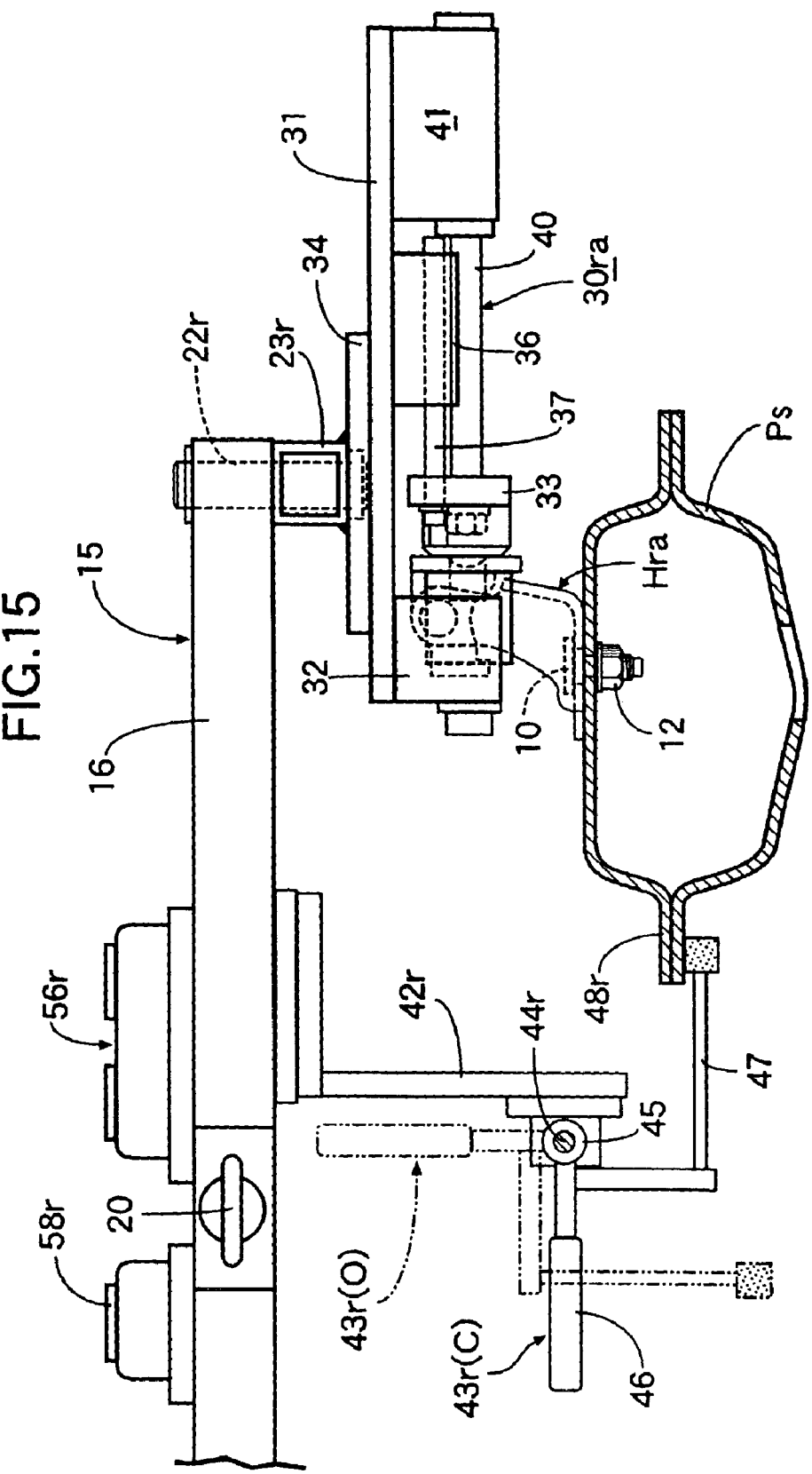
FIG. 15 is a view taken in the direction of an arrow 15 in FIG. 9.
Figure 16:
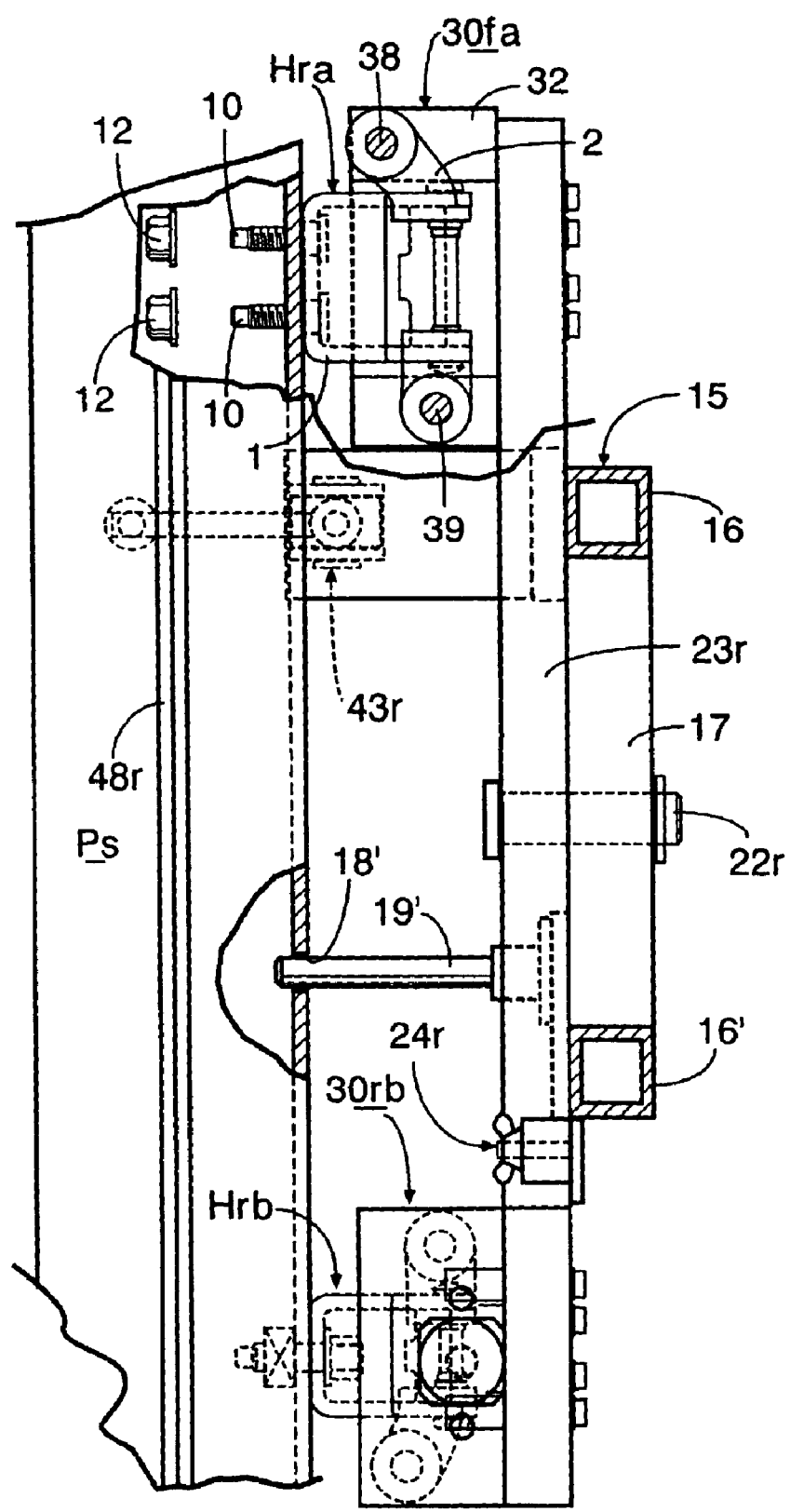
FIG. 16 is a sectional view taken along a line 16—16 in FIG. 9.

Each of the adjusting and fixing means 24f and 24r is comprised of a stationary scale plate 25 fixedly mounted on the jig frame 15, a turn plate 26 fixedly mounted on the support arm 23f, 23r and superposed on the stationary scale plate 25, and a fixing bolt 27 capable of connecting both of the plates 15 and 26 to each other, as shown in FIGS. 10 and 14. Adjusted-position graduations 28 are marked on the stationary scale plate 25, so that the corresponding support arm 23f, 23r can be brought into a desired turned position by setting an end edge of the turn plate 26 at a suitable adjusted-position graduation 28, and can be fixed by tightening the fixing bolt 27 at that position.

A pair of upper and lower front hinge positioning and retaining means 30fa and 30fb are mounted on the front support arm 23f, and a pair of upper and lower rear hinge positioning and retaining means 30ra and 30rb are mounted on the rear support arm 23r.

As shown in FIGS. 10, 11, 13 and 14, each of the hinge positioning and retaining means 30fa, 30fb, 30ra and 30rb includes a base plate 31 fixed to a mounting plate 34 fixedly mounted on each of the support arms 23f and 23r, so that its position can be adjusted vertically and longitudinally by a position-adjusting means (not shown), a stopper member 32 fixedly mounted on the base plate 31, and a push member 33 capable of releasably clamping the door-side hinge arm 2 of the corresponding door hinges Hfa, Hfb, Hra and Hrb by cooperation with the stopper member 32.

The stopper member 32 includes a pair of upper and lower bearing portions 32a and 32b capable of receiving opposite ends of the door-side hinge arm 2, and a positioning guide bore 35 is provided in the upper bearing portion 34 and has a diameter equal to that of the bolt bore 5 in the door-side hinge arm 2.

A pair of upper and lower guide tubes 36 and 36' are fixedly mounted on the base plate 31 to extend in the longitudinal direction of the automobile body B, and the push member 33 is secured to front ends of support rods 37 and 37' slidably received in the guide tubes 36 and 36'. The push member 33 includes a pair of upper and lower pushing portions 33a and 33b confronted to the bearing portions 32a and 32b. A positioning plunger 38 is mounted on the upper pushing portion 33a and capable of being fitted into the positioning guide bore 35 through the upper bolt bore 5 in the door-side hinge arm 2, and a spherical projection 39 is provided on the lower pushing portion 33b and capable of being engaged into the lower bolt bore 5 in the door-side hinge arm 2.

An operating rod 40 is disposed in parallel to and between the pair of support rods 37 and 37' and secured to the push member 33, and an air cylinder 41 is mounted to the base plate 31 for operating the operating rod 40 axially to move the push member 33 toward and away from the stopper member 32.

As shown in FIGS. 10 to 12, 14 and 15, front and rear brackets 42f and 42r are provided in a rising manner at front and rear portions of the jig frame 15, respectively, and front and rear clamp members 43f and 43r are supported at tip ends of the front and rear brackets 42f and 42r through vertical pivots 44f and 44r, respectively.

Each of the clamp members 43f and 43r comprises a boss 45 rotatably fitted into the corresponding pivot 44f, 44r, and an operating arm 46 and a clamp arm 47 coupled to an outer periphery of the boss 45, so that the clamp arm 47 can be operated in turning movement by the operating arm 46 between a closed position C where it clamps a peripheral edge flange portion 48f of the front pillar Pf or a peripheral edge flange portion 48r of the center pillar Ps from the inside, and an opened position O where it releases the flange portion 48f or 48r. In Figures, reference characters 56f and 56r are switches for operating, in advancing and retracting movements, the air cylinders 41 of the upper front and rear hinge positioning and retaining means 30fa, 30fb; 30ra, 30rb. Reference characters 57f and 57r denote switches for operating, in advancing and retracting movements, the air cylinders 41 of the lower front and rear hinge positioning and retaining means 30fa, 30fb; 30ra, 30rb. Reference character 58f denotes a switch for operating, in retracting movement, the air cylinders 41 of the upper and lower front hinge positioning and retaining means 30fa and 30fb all together, and reference character 58r denotes a switch for operating, in retracting movement, the air cylinders 41 of the upper and lower rear hinge positioning and retaining means 30ra and 30rb all together.

In using the door hinge-assembling jig J, the ropes or cables 21 are previously lifted or lowered by the lift (not shown) to set the door hinge-assembling jig J at a predetermined level in a door hinge-assembling station on the automobile manufacturing line, so that the positioning pins 19 and 19' of the jig frame 15 are matched to the positions of the positioning bores 18 and 18' of the automobile body B to be manufactured. Thereafter, the position of each base plate 31 secured to each of the mounting plates 34 of the front and rear support arms 23f and 23r is adjusted and fixed by the adjusting means (not shown) in correspondence to the position of attachment of each of the pair of upper and lower front door hinges Hfa and Hfb and the pair of upper and lower rear door hinges Hra and Hrb on the bases of each of the front and rear pivots 22f and 22r.

Then, the front and rear adjusting and fixing means 24f and 24r are loosened, and the front and rear support arms 23f and 23r are turned about the front and rear pivots 22f and 22r while taking account of the ill-fitting correction for correcting the inclinations of the front and rear doors Df and Dr due to their own weights or the like, thereby adjusting the positions of the front and rear hinge positioning and retaining means 30fa, 30fb, 30ra and 30rb. In this case, the turning movements of the front and rear support arms 23f and 23r cause the front and rear hinge positioning and retaining means 30fa, 30fb; 30ra, 30rb to be moved in opposite directions. Therefore, the fittings of the front and rear doors Df and Dr can be adjusted at a stroke and thus, such adjusting operation can be facilitated and expedited. After this adjustment, the front and rear adjusting and fixing means 24f and 24r are tightened.

Figure 13:
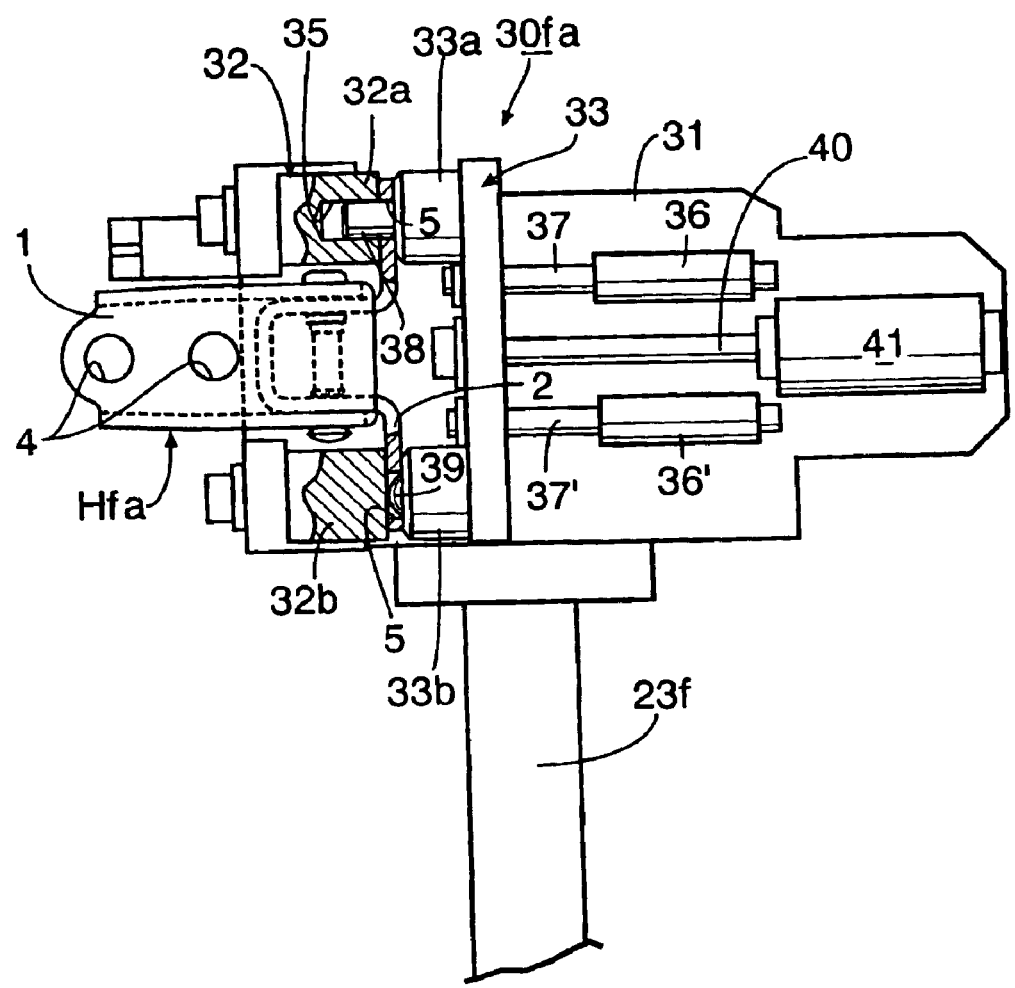
FIG. 13 is a view similar to FIG. 10 for explaining the operation with the upper and lower front door hinges positioned and retained.

After such adjustment, the front and rear door hinges Hfa, Hfb, Hra and Hrb are positioned and retained by the front and rear hinge positioning and retaining means 30fa, 30fb, 30ra and 30rb, as shown in FIG. 13, prior to the arrival of the white body B.

In such positioning and retaining of each of the hinges Hfa, Hfb, Hra and Hrb, first, the push member 33 is retracted by the air cylinder 41, and the upper bolt bore 5 in the corresponding door-side hinge arm 2 is fitted over the outer periphery of the positioning plunger 38 of the push member 33, while the lower bolt bore 5 is brought into engagement with the positioning projection 39 of the push member 33. Then, the air cylinder 41 is operated to advance the push member 33 toward the stopper member 32, thereby clamping the door-side hinge arm 2 by the pushing portions 33a and 33b and the bearing portions 32a and 32b, while fitting the positioning plunger 38 into the positioning guide bore 35 in the stopper member 32.

When the white body B reaches a place where the door hinge-assembling jig J stands by, the front and rear positioning pins 19 and 19' are fitted into the front and rear positioning bores 18 and 18' of the automobile body B, respectively while pushing the jig frame 15 against the outer wall of the white body B. In this case, the operator can move the jig frame 15 lightly in the longitudinal and lateral directions of the white body B to extremely easily fit the front and rear positioning pins 19 and 19' into the front and rear positioning bores 18 and 18' of the automobile body B, because the jig frame 15 has been hung down at the predetermined level by the ropes or cables 21. At the same time, in each of the front door hinges Hfa and Hfb, the coupling bolt 10 of the body-side hinge arm 1 is inserted into the bolt bore 4 in the front pillar Pf, and the body-side hinge arm 1 is brought into abutment against the outer surface of the front pillar Pf. In each of the rear door hinges Hra and Hrb, the coupling bolt 10 of the body-side hinge arm 1 is matched to the bolt bores 11 in the front pillar Pf and the center pillar Ps, and the body-side hinge arm 1 is brought into abutment against the outer surface of the center pillar Ps.

Thereupon, the operating arm 46 of each of the front and rear clamp members 43f and 43r is turned to the closed position C as described above to clamp the peripheral edge flange portion 48f, 48r of the front pillar Pf or the center pillar Ps from the inside. Thus, the front and rear clamp members 43f and 43r clamp both of the front pillar Pf and the front door hinges Hfa and Hfb as well as both of the center pillar Pr and the rear door hinges Hra and Hrb by cooperation with the front and rear hinge positioning and retaining means 30fa, 30fb, 30ra and 30rb, respectively.

In this state, in each of the front door hinges Hfa and Hfb, the body-side hinge arm 1 can be secured at a predetermined position on the front pillar Pf by threadedly fitting the bolt 6 inserted through the bolt bores 4 in the body-side hinge arm 1 into the welding nut 8 in the front pillar Pf to tighten the bolt 6. In each of the rear door hinges Hra and Hrb, the body-side hinge arm 1 can be secured at a predetermined position on the center pillar Ps by inserting the coupling bolt 10 of the body-side hinge arm 1 through the bolt bore 11 in the center pillar Ps and threadedly fitting the nut 12 over the coupling bolt 10 to tighten the nut 12.

After assembling of the front and rear door hinges Hfa, Hfb, Hra and Hrb, the operating arms 46 of the front and rear clamp members 43f and 43r are operated into the opened positions O to release the front and center pillars Pf and Ps, and the push members 33 are retracted by the retracting operation of the air cylinders 41 to release the door hinges Hfa, Hfb, Hra and Hrb.

Figure 17:
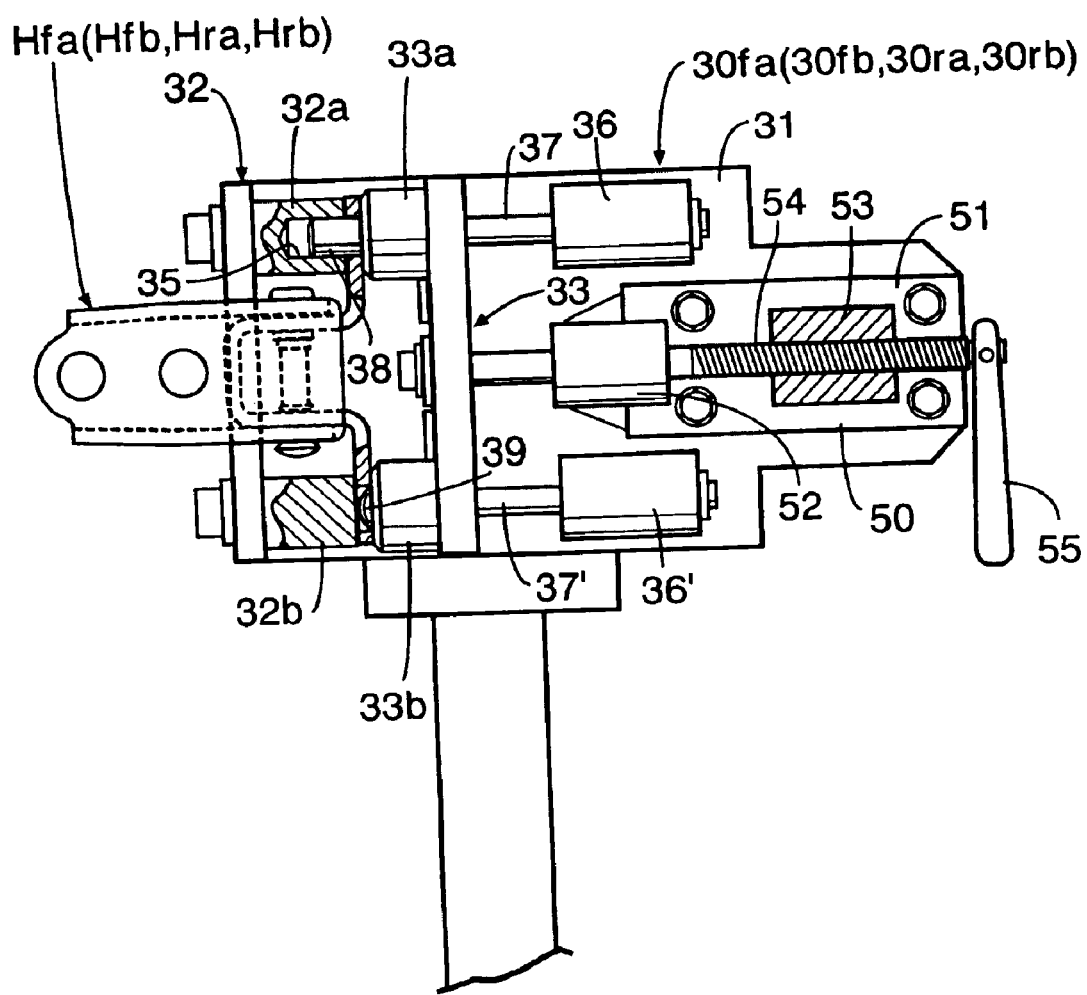
FIG. 17 is a front view showing a modification to a hinge positioning and retaining means in the door hinge-assembling jig.

A modification to the door hinge-assembling jig J will be described below with reference to FIG. 17.

In this modification, a manually operating device 50 is connected to the push member 33, in place of the air cylinders 41 of the front and rear hinge positioning and retaining means 30fa, 30fb, 30ra and 30rb in the above-described embodiment. The manually operating device 50 includes a guide tube 52 and an externally threaded tube 53 disposed coaxially and secured to a support base 51 fixed to a base plate 31, an operating rod 54 which is threadedly fitted in the externally threaded tube 53 and rotatably and slidably received in the guide tube 52, and is rotatably connected at its front end to the push member 33, and a handle 55 mounted at a rear end of the operating rod 54.

Thus, the push member 33 can be moved toward or away from the stopper member 32 by rotating the operating rod 54 rightwards or leftwards by the handle 55, and during this movement, the front door hinges Hfa and Hfb or the rear door hinges Hra and Hrb can be clamped or released.

The other arrangement is the same as that of the previous embodiment. Therefore, components or portions in FIGS. 9 and 10 corresponding to those in the previous embodiment are designated by like reference numerals and characters, and the description of them is omitted.

It will be understood that the present invention is not limited to the above-described embodiments, and various modifications in design may be made without departing from the subject matter of the invention defined in claims. For example, the present invention is also applicable to the assembling of door hinges to a body of a two-door type automobile.

What is claimed is:

1. A door mounting method for an automobile, comprising:

a door hinge-attaching step of preparing door hinges each comprised of a body-side hinge arm, a door-side hinge arm, and a hinge pin which connects said hinge arms to each other for rotation relative to each other, and attaching said body-side hinge arms to an uncoated automobile body;

a temporary door-fixing step of temporarily fixing uncoated doors to said door-side hinge arms of said door hinges; a coating step of coating said automobile body and said doors simultaneously after said temporary door-fixing step;

a door-removing step of removing said doors from said door-side hinge arms after said coating step;

an equipping step of equipping or fitting-out said coated automobile body and said coated doors individually; and a final door-attaching step of finally attaching the doors to the corresponding door-side hinge arms after said equipping step, wherein the positions of attachment of said door-side hinge arms on the doors are previously determined, and at said temporary door-fixing step, the positions of hinge positioning and retaining means of a door hinge-assembling jig set at a predetermined position on the automobile body are adjusted while taking account of the correction of the ill-fitting of the doors to be generated when the doors will be attached to said automobile body at said final door-attaching step, and said body-side hinge arms of said door hinges retained on said hinge positioning and retaining means are attached to said automobile body, wherein said predetermined position of said door hinge-assembling jip is defined by a pair of positioning pins projectingly provided on a frame of said door hinge-assembling jip and which are fitted within at least a pair of positioning bores provided in an outer wall of the automobile body.

2. A door mounting method for an automobile according to claim 1, wherein at said door hinge-attaching step, said front and rear door hinges for supporting the front and rear doors are retained on the front and rear hinge positioning and retaining means provided on the same door hinge-assembling jig, and the body-side hinge arms of said front and rear door hinges are attached to a front pillar and a center pillar of the automobile body, respectively.

3. A door mounting method for an automobile according to claim 1 or 2, wherein said temporary door-attaching step comprises a temporary rear door-fixing step for carrying out the temporary fixing of the rear door to said rear door hinges, and a temporary front door-fixing step for carrying out the temporary fixing of the front door to said front door hinges after said temporary rear door-fixing step.

4. A door mounting method for an automobile according to claim 1 or 2, wherein when the doors are temporarily fixed to said door-side hinge arms at said temporary door-fixing step, a temporary fixing bolt is used which has a head flange with a diameter smaller than a diameter of a head flange of a bolt used to attach the doors to the door-side hinge arms at said final door-attaching step.

5. A door hinge-assembling jig for an automobile, comprising:

a jig frame having positioning pins projectingly provided on said jip frame and configured to be fitted within at least two positioning bores provided in an outer wall of an automobile body;

a support arm connected to said jig frame by a pivot located in an intermediate portion between a pair of upper and lower hinge-mounting portions on the automobile body to extend vertically;

an adjusting and fixing means for fixing said support arm any turned and adjusted positions; and a pair of upper and lower hinge positioning and retaining means mounted at upper and lower opposite ends of said support arm for positioning and retaining door hinges to be bolted to said hinge-mounting portions.

6. A door hinge-assembling jig for an automobile according to claim 5, wherein a rope or cable is connected to said jig frame for hanging down said jig frame.

7. A door hinge-assembling jig for automobile according to claim 5, wherein each of said hinge positioning and retaining means comprises a base plate fixed to said support arm, a stopper member fixedly mounted on said base plate, a push member supported on said base plate for movement between a closed position where said push member clamps the door-side hinge arm of the door hinge by cooperation with said stopper member, and an opened position where said push member is positioned at a distance apart from said stopper member to release a door-side hinge arm, and an operating means capable of operating said push member between said closed position and said opened position, said push member being provided with positioning members to be brought into engagement in bolt bores in said door-side hinge arm.

8. A door mounting method for an automobile, comprising:
   a door hinge-attaching step of preparing door hinges each comprised of a body-side hinge arm, a door-side hinge arm, and a hinge pin which connects said hinge arms to each other for rotation relative to each other, and attaching said body-side hinge arms to an uncoated automobile body;
   a temporary door-fixing step of temporarily fixing uncoated doors to said door-side hinge arms of said door hinges;
   a coating step of coating said automobile body and said doors simultaneously after said temporary door-fixing step;
   a door-removing step of removing said doors from said door-side hinge arms after said coating step;
   an equipping step of equipping or fitting-out said coated automobile body and said coated doors individually; and
   a final door-attaching step of finally attaching the doors to the corresponding door-side hinge arms after said equipping step,
   wherein the positions of attachment of said door-side hinge arms on the doors are previously determined, and at said temporary door-fixing step, the positions of hinge positioning and retaining means of a door hinge-assembling jig set at a predetermined position on the automobile body are adjusted while taking account of the correction of the ill-fitting of the doors to be generated when the doors will be attached to said automobile body at said final door-attaching step, and said body-side hinge arms of said door hinges retained on said hinge positioning and retaining means are attached to said automobile body, and
   wherein when the doors are temporarily fixed to said door-side hinge arms at said temporary door-fixing step, a temporary fixing bolt is used which has a head flange with a diameter smaller than a diameter of a head flange of a bolt used to attach the doors to the door-side hinge arms at said final door-attaching step.

9. A door mounting method for an automobile according to claim 8, wherein said temporary door-attaching step comprises a temporary rear door-fixing step for carrying out the temporary fixing of the rear door to said rear door hinges, and a temporary front door-fixing step for carrying out the temporary fixing of the front door to said front door hinges after said temporary rear door-fixing step.

10. A door mounting method for an automobile according to claim 8, wherein at said door hinge-attaching step, said front and rear door hinges for supporting the front and rear doors are retained on the front and rear hinge positioning and retaining means provided on the same door hinge-assembling jig, and the body-side hinge arms of said front and rear door hinges are attached to a front pillar and a center pillar of the automobile body, respectively.

11. A door mounting method for an automobile according to claim 10, wherein said temporary door-attaching step comprises a temporary rear door-fixing step for carrying out the temporary fixing of the rear door to said rear door hinges, and a temporary front door-fixing step for carrying out the temporary fixing of the front door to said front door hinges after said temporary rear door-fixing step.

12. A door hinge-assembling jig for an automobile, comprising:
   a jig frame having positioning engage portions to be brought into engagement for positioning with at least two points of an outer wall of an automobile body;
   a support arm connected to said jig frame by a pivot located in an intermediate portion between a pair of upper and lower hinge-mounting portions on the automobile body to extend vertically;
   an adjusting and fixing means capable of fixing said support arm at any turned and adjusted positions; and
   a pair of upper and lower hinge positioning and retaining means mounted at upper and lower opposite ends of said support arm for positioning and retaining door hinges to be bolted to said hinge-mounting portions, wherein each of said hinge positioning and retaining means comprises a base plate fixed to said support arm, a stopper member fixedly mounted on said base plate, a push member supported on said base plate for movement between a closed position where said push member clamps the door-side hinge arm of the door hinge by cooperation with said stopper member, and an opened position where said push member is positioned at a distance apart from said stopper member to release a door-side hinge arm, and an operating means capable of operating said push member between said closed position and said opened position, said push member being provided with positioning members to be brought into engagement in bolt bores in said door-side hinge arm.

13. A door hinge-assembling jig for an automobile according to claim 12, wherein a rope or cable is connected to said jig frame for hanging down said jig frame.

* * * * *